United States Patent
Webber et al.

(10) Patent No.: US 8,812,395 B2
(45) Date of Patent: Aug. 19, 2014

(54) SYSTEM AND METHOD FOR VIRTUAL PIGGYBANK

(75) Inventors: Jo Webber, Philadelphia, PA (US); Pradeep Ittycheria, Philadelphia, OR (US)

(73) Assignee: Virtual Piggy, Inc., Hermosa Beach, CA (US)

(*) Notice: Subject to any disclaimer, the term of this patent is extended or adjusted under 35 U.S.C. 154(b) by 0 days.

(21) Appl. No.: 13/247,572

(22) Filed: Sep. 28, 2011

(65) Prior Publication Data

US 2012/0259740 A1 Oct. 11, 2012

Related U.S. Application Data

(63) Continuation of application No. 12/991,059, filed as application No. PCT/US2010/047794 on Sep. 3, 2010, now abandoned.

(60) Provisional application No. 61/272,233, filed on Sep. 3, 2009, provisional application No. 61/272,235, filed on Sep. 3, 2009, provisional application No. 61/272,232, filed on Sep. 3, 2009.

(51) Int. Cl.
*G06Q 20/00* (2012.01)

(52) U.S. Cl.
USPC .................................. 705/39; 705/35

(58) Field of Classification Search
USPC .......................................................... 705/39
See application file for complete search history.

(56) References Cited

U.S. PATENT DOCUMENTS

| | | | |
|---|---|---|---|
| 5,262,943 A | 11/1993 | Thibado et al. |
| 6,173,269 B1 | 1/2001 | Soloki et al. |
| 6,397,256 B1 | 5/2002 | Chan et al. |
| 6,785,824 B1 | 8/2004 | Grassle |
| 7,171,382 B2 | 1/2007 | Beacham |
| 7,171,392 B2 | 1/2007 | Brookner et al. |
| 7,302,272 B2 | 11/2007 | Ackley |
| 7,562,387 B2 | 7/2009 | Nguyen et al. |
| 7,640,336 B1 | 12/2009 | Lu et al. |
| 7,657,457 B2 | 2/2010 | Razumov |
| 7,734,779 B1 | 6/2010 | Piccionelli |

(Continued)

FOREIGN PATENT DOCUMENTS

| JP | 2006-526327 A | 11/2006 |
|---|---|---|
| JP | 2007-510979 A | 4/2007 |

(Continued)

OTHER PUBLICATIONS

U.S. Office Action for U.S. Appl. No. 12/991,053, dated Sep. 19, 2013.

(Continued)

*Primary Examiner* — James A Vezeris
(74) *Attorney, Agent, or Firm* — Morgan, Lewis & Bockius LLP

(57) ABSTRACT

A method of providing control preferences for a prospective Internet user, the method comprising the steps of establishing a first account, the settings of the first account being stored in a database; establishing a second account, the settings of the second account being stored in the database; linking the first and second accounts such that control settings of the second account are determined through the first account; and making a purchase from the second account consistent with the control settings of the second account.

29 Claims, 10 Drawing Sheets

(56) References Cited

U.S. PATENT DOCUMENTS

| | | |
|---|---|---|
| 7,828,652 B2 | 11/2010 | Nguyen et al. |
| 7,945,512 B2 | 5/2011 | Scipioni et al. |
| 8,001,045 B1 | 8/2011 | McClinton |
| 8,116,726 B2 | 2/2012 | Richardson et al. |
| 8,127,982 B1 | 3/2012 | Casey et al. ............ 235/379 |
| 8,132,212 B2 | 3/2012 | Huegel |
| 8,249,986 B2 | 8/2012 | Scipioni et al. |
| 8,312,484 B1 | 11/2012 | McCarty et al. |
| 2002/0049806 A1 | 4/2002 | Gatz et al. |
| 2002/0055911 A1 | 5/2002 | Guerreri |
| 2002/0074397 A1 | 6/2002 | Matthews |
| 2002/0120866 A1 | 8/2002 | Mitchell et al. |
| 2003/0088490 A1 | 5/2003 | Beacham |
| 2003/0154138 A1 | 8/2003 | Phillips et al. |
| 2003/0204445 A1 | 10/2003 | Vishik et al. |
| 2003/0233296 A1 | 12/2003 | Wagner |
| 2004/0153421 A1 | 8/2004 | Robinson |
| 2004/0215534 A1 | 10/2004 | Gautier et al. |
| 2005/0038744 A1* | 2/2005 | Viijoen ............ 705/42 |
| 2005/0039053 A1 | 2/2005 | Walia |
| 2005/0044181 A1 | 2/2005 | Lee |
| 2005/0076367 A1 | 4/2005 | Johnson et al. |
| 2005/0102407 A1 | 5/2005 | Clapper |
| 2006/0069627 A1 | 3/2006 | Petersen et al. |
| 2006/0161593 A1 | 7/2006 | Mori et al. |
| 2006/0161669 A1 | 7/2006 | Mathew et al. |
| 2006/0173792 A1 | 8/2006 | Glass |
| 2006/0259778 A1 | 11/2006 | Gudorf et al. |
| 2007/0118475 A1 | 5/2007 | Picciallo et al. |
| 2007/0203954 A1 | 8/2007 | Vargas et al. |
| 2007/0220494 A1 | 9/2007 | Spooner |
| 2007/0245152 A1 | 10/2007 | Pizano et al. |
| 2007/0250392 A1 | 10/2007 | Paulsen et al. |
| 2007/0260603 A1 | 11/2007 | Tuscano et al. |
| 2008/0004984 A1 | 1/2008 | Sendo et al. |
| 2008/0033740 A1 | 2/2008 | Cahn et al. |
| 2008/0148362 A1 | 6/2008 | Gilder et al. |
| 2008/0168548 A1 | 7/2008 | O'Brien |
| 2008/0228615 A1 | 9/2008 | Scipioni et al. |
| 2008/0228637 A1* | 9/2008 | Scipioni et al. ........ 705/39 |
| 2008/0228638 A1* | 9/2008 | Scipioni et al. ........ 705/39 |
| 2008/0307339 A1 | 12/2008 | Boro et al. |
| 2009/0043747 A1 | 2/2009 | Smith et al. |
| 2009/0064302 A1 | 3/2009 | Colella |
| 2009/0112763 A1 | 4/2009 | Scipioni et al. |
| 2009/0235086 A1 | 9/2009 | Lai et al. |
| 2009/0281937 A1* | 11/2009 | Gupta et al. ............ 705/35 |
| 2009/0292595 A1 | 11/2009 | Tonnison et al. |
| 2009/0299841 A1 | 12/2009 | Bishop et al. |
| 2010/0042912 A1 | 2/2010 | Whitaker |
| 2010/0114733 A1 | 5/2010 | Collas et al. |
| 2010/0223184 A1 | 9/2010 | Perlman |
| 2011/0010293 A1 | 1/2011 | Giordano et al. |
| 2011/0047629 A1 | 2/2011 | Mitchell et al. |
| 2011/0184855 A1 | 7/2011 | Webber et al. |
| 2011/0185399 A1 | 7/2011 | Webber et al. |
| 2011/0185400 A1 | 7/2011 | Webber et al. |
| 2011/0237222 A1 | 9/2011 | Niejadlik |
| 2012/0005582 A1 | 1/2012 | Webber et al. |
| 2012/0022969 A1* | 1/2012 | Collas et al. ............ 705/26.41 |
| 2012/0123865 A1 | 5/2012 | Salzano |
| 2012/0171990 A1 | 7/2012 | Williams et al. |
| 2012/0209768 A1 | 8/2012 | Nuzzi |
| 2012/0209772 A1 | 8/2012 | Nuzzi et al. |
| 2012/0259768 A1 | 10/2012 | Mukherjee |
| 2012/0278202 A1 | 11/2012 | Webber et al. |
| 2012/0278233 A1 | 11/2012 | Webber et al. |
| 2012/0303523 A1 | 11/2012 | Webber et al. |
| 2013/0018792 A1 | 1/2013 | Casey et al. |
| 2013/0080323 A1 | 3/2013 | Scipioni |
| 2013/0110670 A1 | 5/2013 | Webber et al. |
| 2013/0110716 A1 | 5/2013 | Rekhi et al. |

FOREIGN PATENT DOCUMENTS

| | | |
|---|---|---|
| KR | 10-2002-0021515 A | 3/2002 |
| KR | 2002-0021515 | 3/2002 |
| KR | 10-0374296 B1 | 2/2003 |
| KR | 10-2003-0066494 | 8/2003 |
| KR | 10-2003-0066494 A | 8/2003 |
| KR | 10-2006-0103363 A | 9/2006 |
| KR | 10-2008-0009175 A | 1/2008 |
| WO | 00/36570 A1 | 6/2000 |
| WO | 2004/089006 A2 | 10/2004 |
| WO | 2008/101312 A1 | 8/2008 |
| WO | 2011/028985 A2 | 3/2011 |
| WO | 2011/028989 A2 | 3/2011 |
| WO | 2011/028991 A2 | 3/2011 |
| WO | 2011/028992 A2 | 3/2011 |

OTHER PUBLICATIONS

Notification of Transmittal of Search Report and Written Opinion of the International Searching Authority from the PCT dated Oct. 29, 2012 in a counterpart PCT application.

Notification of Transmittal of Search Report and Written Opinion of the International Searching Authority from the PCT dated Oct. 4, 2012 in a counterpart PCT application.

International Search Report (PCT/US2012/033022), Oct. 4, 2012.

International Search Report (PCT/US2012/033002), Oct. 29, 2012.

International Search Report (PCT/US2012/032998), Oct. 31, 2012.

International Search Report (PCT/US2010/047794), May 24, 2011.

International Search Report (PCT/US2010/047796), May 2, 2011.

IGN Staff (E3 2002: All About Xbox Live, Full Blowout on Microsoft's Online Service Including Price, Launch Titles, and More, May 20, 2002).

International Search Report (PCT/US2010/047785), Apr. 29, 2011.

Written Opinion (PCT/US2010/047785), Apr. 29, 2011.

International Preliminary Report on Patentability (PCT/US2010/047785), Mar. 6, 2012.

International Search Report (PCT/US2010/047790), Jun. 8, 2011.

Written Opinion (PCT/US2010/047790), Jun. 8, 2011.

International Preliminary Report on Patentability (PCT/US2010/047790), Mar. 6, 2012.

Written Opinion (PCT/US2010/047794), May 24, 2011.

International Preliminary Report on Patentability (PCT/US2010/047794), Mar. 6, 2012.

Written Opinion (PCT/US2010/047796), May 2, 2011.

International Preliminary Report on Patentability (PCT/US2010/047796), Mar. 6, 2012.

Content Watch Internet Protection "Net Nanny Parental Controls User Guide," 2007, ContentWatch Inc., pp. 1-83—Retrieved from http://www.netnanny.com/assets/documentation/nn/netnanny_56.pdf.

USPTO—Office Action for U.S. Appl. No. 12/991,057—Issued—Oct. 31, 2013.

U.S. Office Action for U.S. Appl. No. 13/567,610, dated Oct. 11, 2013.

Office Action dated Jan. 21, 2014, issued by the U.S. Patent & Trademark Office in U.S. Appl. No. 13/431,044.

CIPO: Examination Report for Canadian Patent Application No. 2,772,399—Issued on Oct. 23, 2013.

USPTO: Office Action for U.S. Appl. No. 13/431,256—Issued on Oct. 11, 2013.

USPTO—Notice of Allowance for U.S. Appl. No. 12/991,063—Issued on Oct. 21, 2013.

\* cited by examiner

TCP/IP Layering Model

SYSTEM AND METHOD FOR VIRTUAL PIGGYBANK

This application is a continuation of U.S. patent application Ser. No. 12/991,059, which was filed on Nov. 4, 2010 now abandoned, which is a U.S. National Stage of International Application No. PCT/US2010/047794, filed on Sep. 3, 2010, which claims priority to U.S. Provisional Patent Application No. 61/272,233, filed on Sep. 3, 2009. U.S. patent application Ser. No. 12/991,059 also claims priority to U.S. Provisional Patent Application No. 61/272,233, U.S. Provisional Patent Application No. 61/272,235, U.S. Provisional Patent Application No. 61/272,234, and U.S. Provisional Patent Application No. 61/272,232, all of which were filed on Sep. 3, 2009. The entirety of each of the above is incorporated herein by reference.

CROSS-REFERENCE TO RELATED APPLICATIONS

This application is related to U.S. patent application Ser. No. 12/991,063, which claims the priority and benefit of U.S. Provisional Patent Application No. 61/272,235, which was filed on Sep. 3, 2009, and is incorporated herein by reference.

This application is related to U.S. patent application Ser. No. 12/991,053, which claims the priority and benefit of U.S. Provisional Patent Application No. 61/272,233, which was filed on Sep. 3, 2009, and is incorporated herein by reference.

This application is related to U.S. patent application Ser. No. 12/991,057, which claims the priority and benefit of U.S. Provisional Patent Application No. 61/272,234, which was filed on Sep. 3, 2009, and is incorporated herein by reference.

BACKGROUND OF THE INVENTION

1. Field of the Invention

The present invention relates an Internet payment system and method, and more particularly to an Internet payment system and method having a variety of customizable controls.

2. Discussion of the Related Art

Using the Internet has become extremely easy, and one aspect of this ease is that children of very young ages are able to gain access to Internet websites of all kinds and make purchases at a variety of websites. Juxtaposed with this ease is the Children's Online Privacy Protection Act (COPPA), which lays out specific guidelines for how website operators and online businesses must interact with children 13 and under. In general COPPA requires parental notification and consent prior to an online operator's collecting, using or disclosing a child's personal information. Compliance with COPPA can be daunting for an online business. While some online businesses are taking steps to comply with COPPA, many of the new media companies including Facebook are choosing to avoid COPPA compliance by restricting their sites to over 13's, and foregoing a significant business opportunity in interacting with the under 13 market segment. In the past, parents were often happy to give their children small amounts of money to buy comics and candy from a corner store, there is no equivalent mechanism currently for the internet. The generation of children growing up today have never known a world where the internet was not present and they expect to be able to play games, interact with friends and make purchases online. There is ever increasing pressure on the parents and guardians to provide more online access to their children, while at the same time a worrying lack of control in the online world.

Parental controls are known and generally fall into two categories: active control and passive control. Active controls (e.g., hardware and software firewalls; and hardware access controls and systems) prevent a child from accessing information over the Internet that a parent does not want them to retrieve and view. Passive controls (e.g., a software audit system) allow a parent to audit the information their children have been accessing and the activities their children have been performing while online. While these active and passive control systems help parents to control the information available to children via the Internet, there are no provisions to control the types of services that children may sign up for and/or purchase over the Internet.

Currently, parents may either provide their children with a credit card or purchase a pre-paid card so that their children may conduct a monetary transaction on the Internet. While this may work for a few instances, it is not a viable option with the rapid growth of websites, online games and online applications appealing to children and the ever increasing online footprint of children. The credit card is also particularly troubling since it provides no control or limitation on what or how much the child can acquire.

With the rapid proliferation of websites, online games, and online applications for children under 13, there is a need for a system that parents can setup and children can use to conduct online monetary transactions while limiting or obviating a child's need to provide their personal information. Thus, a system is needed that will enable a parent to manage a child's access and personal information provided to websites, or in the alternative provide parental consent to the collection and use of certain necessary information as well as to control how money is spent at the websites by a child.

SUMMARY OF THE INVENTION

Accordingly, the present invention is directed to a system and method for a virtual piggybank that substantially obviates one or more problems due to limitations and disadvantages of the related art.

An embodiment of the present invention provides an improved Internet payment method and system.

Another embodiment of the present invention provides an Internet payment method and system that may be used by a child at online websites, games, and applications that have been approved by a parent.

Yet another embodiment of the present invention provides an Internet payment method and system that enables a parent to manage a child's access to websites and control how money is spent at the websites by a child.

Yet another embodiment of the present invention provides an Internet payment method and system that may be used by any user at online websites with certain controls and payment procedures.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the present invention, as embodied and broadly described, the system and method for virtual piggybank includes a method of providing control preferences for a prospective Internet user, the method comprising the steps of establishing a first account, the settings of the first account being stored in a database; establishing a second account, the settings of the second account being stored in the database; linking the first and second accounts such that control settings of the second account are determined through the first account; and making a purchase from the second account consistent with the control settings of the second account.

In another aspect, the system and method for virtual piggybank includes a system providing control preferences for a prospective Internet user comprising a server; and a database hosted on the server, the database storing information for a first account and a second account; wherein control settings of the second account are established through the first account such that a purchase from the second account is consistent with the control settings can be made.

In yet another aspect, the system and method for virtual piggybank includes a method of providing control preferences for a prospective Internet user, the method comprising establishing an online account that includes specific control parameters; activating the online account by accessing a web based system designated by the online account; and controlling a user's use of the web based system through the online account.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the embodiments of the present invention, examples of which are illustrated in the accompanying drawings.

In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented by any type of user (i.e., not limited to parent and child) and on any type of standalone system or client-server compatible system containing any type of client, network, server, and database elements.

Figure 1:
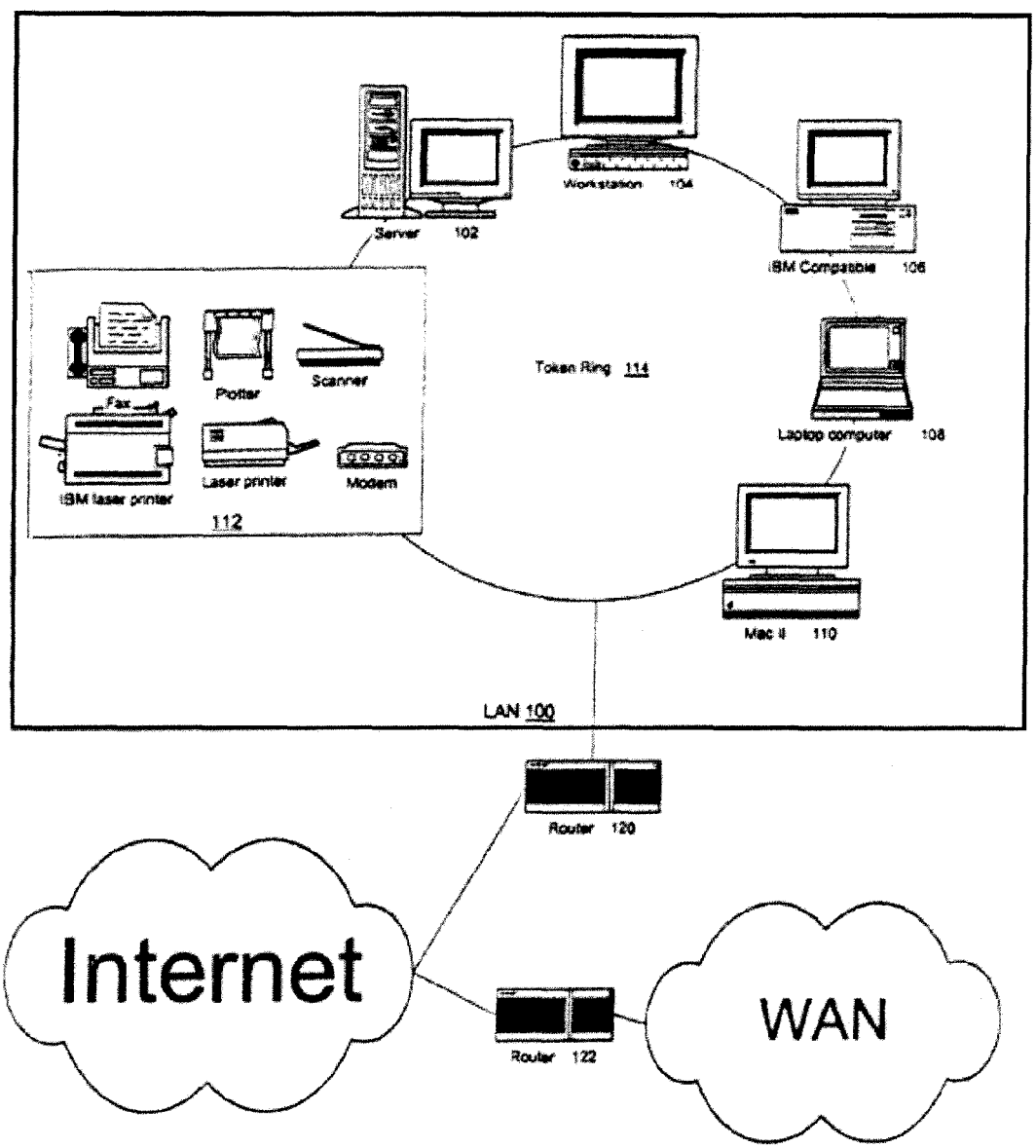
FIG. 1 illustrates an example of a local area network (LAN) 100 that is connected to the Internet and in which the inventive method may be utilized.

FIG. 1 illustrates an example of a local area network (LAN) 100 that is connected to the Internet and in which the inventive system and method may be utilized. LAN 100 comprises a server 102, four computer systems 104, 106, 108, 110, and peripherals, such as printers and other devices 112, that may be shared by components on LAN 100. Computer systems 104, 106, 108, 110 may serve as clients for server 102 and/or as clients and/or servers for each other and/or for other components connected to LAN 100. Components on LAN 100 are preferably connected together by cable media, for example unshielded twisted pair (UTP) Category 5 copper cable, and the network topology may be an Ethernet topology 114. It should be apparent to those of ordinary skill in the art that other media, for example, fiber optic or wireless radio frequency media, may also connect LAN 100 components. It should also be apparent that other network topologies, such as Token Ring, may be used.

Data may be transferred between components on LAN 100 in packets, i.e., blocks of data that are individually transmitted over LAN 100. Routers 120, 122 create an expanded network by connecting LAN 100 to other computer networks, such as the Internet, other LANs or Wide Area Networks (WAN). Routers are hardware devices that may include a conventional processor, memory, and separate I/O interface for each network to which it connects. Hence, components on the expanded network may share information and services with each other. In order for communications to occur between components of physically connected networks, all components on the expanded network and router 304s that connect them must adhere to a standard protocol. Computer networks connected to the Internet and to other networks typically use TCP/IP Layering Model Protocol. It should be noted that other internetworking protocols may be used.

Figure 2:
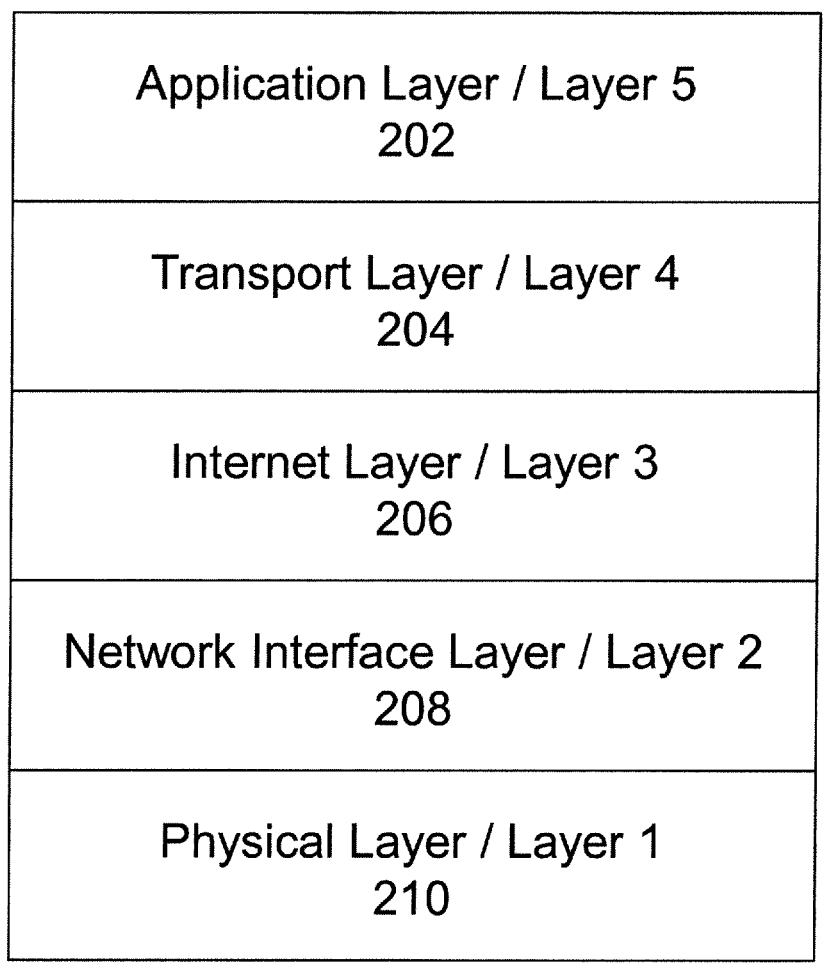
FIG. 2 illustrates the TCP/IP Layering Model.

FIG. 2 illustrates the TCP/IP Layering Model, which is comprised of an application layer (Layer 5) 202, a transport layer (Layer 4) 204, an Internet layer (Layer 3) 206, a network interface layer (Layer 2) 208, and a physical layer (Layer 1) 210. Application layer protocols 202 specify how each software application connected to the network uses the network. Transport layer protocols 204 specify how to ensure reliable transfer among complex protocols. Internet layer protocols 206 specify the format of packets sent across the network as well as mechanisms used to forward packets from a computer through one or more routers to a final destination. Network interface layer protocols 208 specify how to organize data into frames and how a computer transmits frames over the network. Physical layer protocols 210 correspond to the basic network hardware. By using TCP/IP Layering model protocols, any component connected to the network can communicate with any other component connected directly or indirectly to one of the attached networks.

Figure 3:
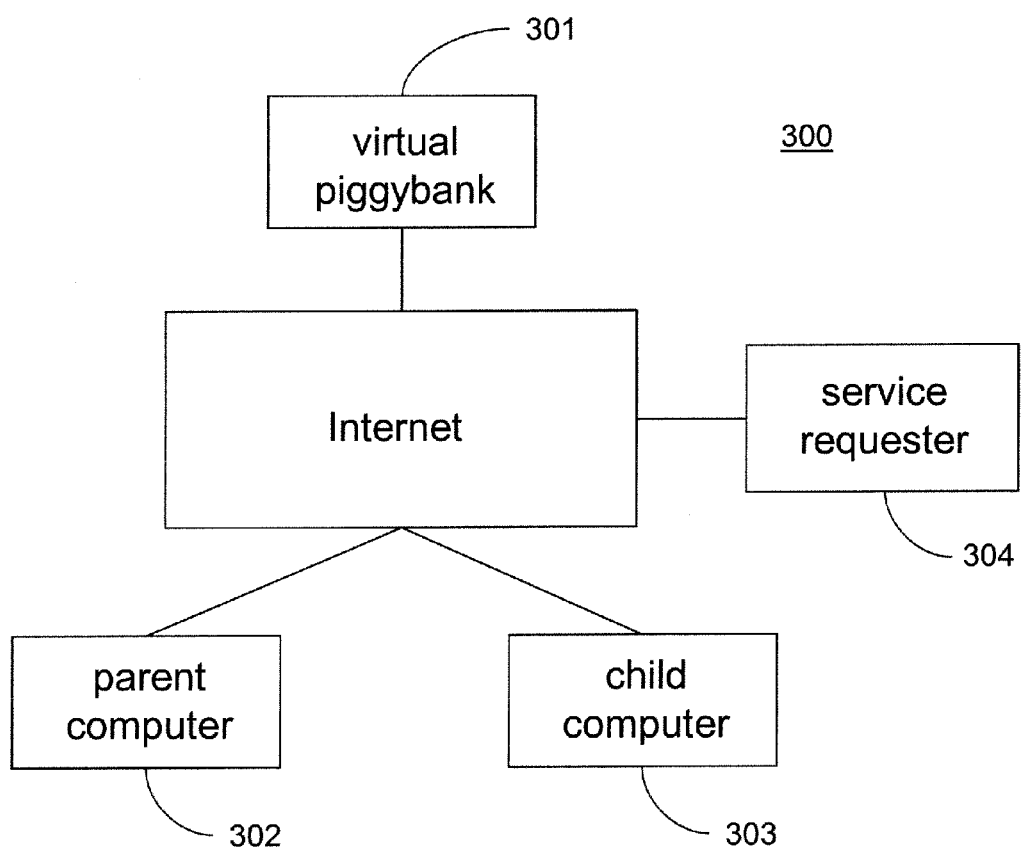
FIG. 3 illustrates a virtual piggybank system according to an exemplary embodiment of the present invention.

FIG. 3 illustrates a virtual piggybank system according to an exemplary embodiment of the present invention.

As shown in FIG. 3, the virtual piggybank system 300 includes a virtual piggybank server 301, parent computer 302, child computer 303, and service requester 304. The virtual piggybank server 301 may include a persistent software system and service that allow one or more persons responsible for one or more children to establish a controlled money management and payment system for use over the Internet. The adult preferences are stored on a database, and include parental/guardian preferences and controls for the money management. The system provides an Application Programming Interface (API) that exposes software functions that other websites, web services and Internet enabled desktop applications can use to enforce the adult preferences when children try to purchase items online. The websites, web services and Internet enabled desktop applications partner with the present system ("virtual piggybank"), and an account is created. Each of the parent computer 302 and child computer 303 may be a desktop computer, laptop computer, tablet or portable computer, smartphone, mobile phone, or other portable computing device. Service requester 304 may include any online application such as websites, online stores, online games, and online applications.

The following description uses as an example a parent as the person desiring to set controls regarding Internet use and a child as being the Internet user who will be controlled. These are only examples, and the invention is not limited to those two classes of people. For example, the following description would be equally applicable to an employer and employee.

Figure 4:
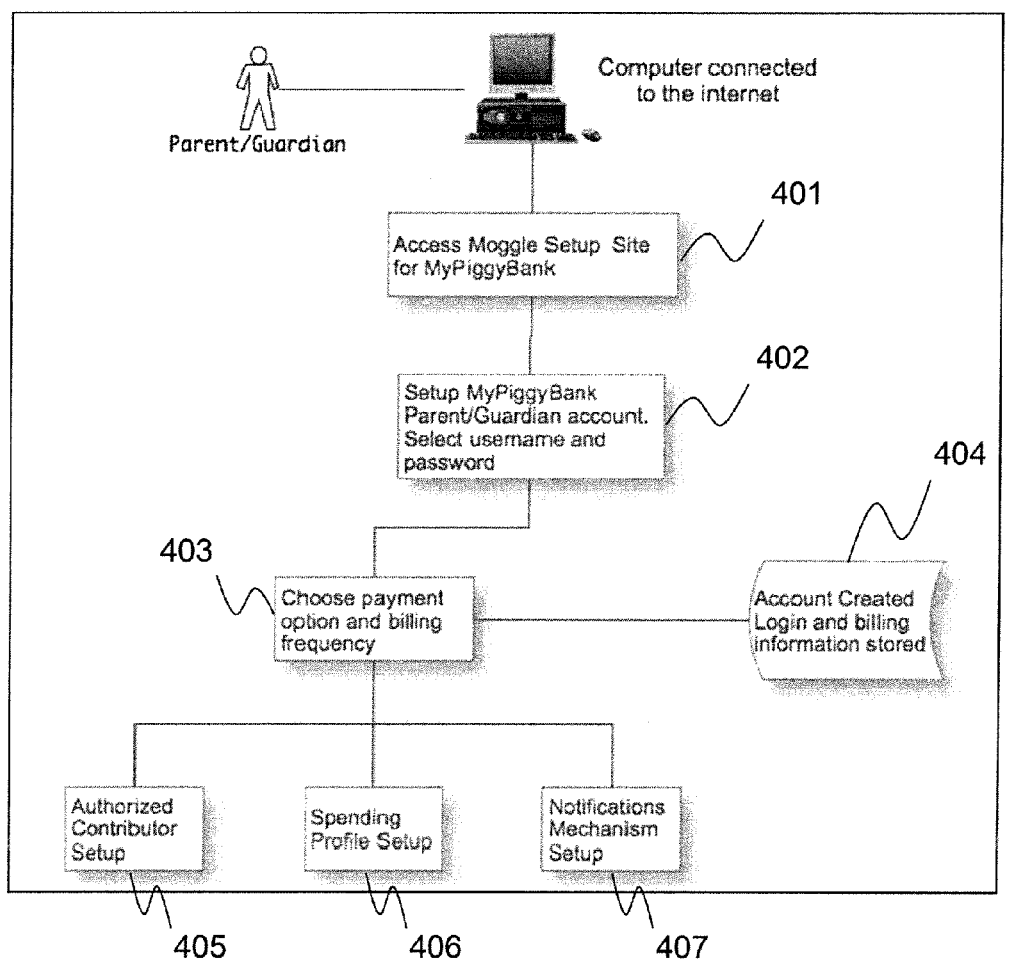
FIG. 4 is a flow chart illustrating a method for implementing a virtual piggybank according to an exemplary embodiment of the present invention.

FIG. 4 is a flow chart illustrating a method for implementing a virtual piggybank according to a first exemplary embodiment of the present invention.

At step 401, a parent accesses the virtual piggybank system via the Internet to establish a virtual piggybank for a child. For example, the virtual piggybank may be an Internet bank account for use by a child, but the virtual piggybank is not limited to this. In order to establish a virtual piggybank for a child, a parent may first establish a parental account.

At step 402, a parent may establish a parental account. The virtual piggybank system may guide the parent through the set up of a parental account. To establish a parental account, a parent profile is created. A parent profile allows a parent to provide information that allows the virtual piggybank system to interact with a parent. For example, the virtual piggybank system may support OpenID. A parent may be able to use an OpenID account to establish a parent profile. However, the virtual piggybank system may request additional information as well, such as a password, name (first, middle and last), address information, verification preference such as e-mail or short message service (SMS) that is used to verify a parental account, primary phone number, mobile phone number that may be used if SMS is selected as a verification preference so that SMS messages may be sent to a mobile phone, a primary e-mail address that may be used if e-mail selected as verification preference, secondary e-mail, password reminder questions, time-zone such that dates and times in the virtual piggybank system are based on this time-zone and not the time-zone of the server, and currency preferences.

The parental account is secure and can only be accessed with the correct user name and password. All data transmissions may be encrypted and secure, such as all profile information. Passwords that may be used by the parent, child or others designated to properly use the system may have expiration dates to insure password strength. After a parental account is established, a parent may then establish one or more child accounts. The settings of a child account may then be controlled by the parental account. For example, the virtual piggybank system may present a number of options from which a parent may choose such that various controls may be imposed on a child by the virtual piggybank.

At step 403, the virtual piggybank has the parent choose a payment option and/or billing frequency. For example, charges made to a child account may be applied to a credit card, debit card, other bank account, or may be billed to a parent on a periodic basis. This information also will be secured through encryption and passwords A parent may establish one or more payment accounts. A payment account is the account that will be used to make payment for purchases made by a child via a child account. For example, a PayPal or Google payment account may be supported by the virtual piggybank system. Of course, the payment account may be any known to those skilled in the art. The parent may provide a User name and password associated with a payment account so that payments from a child account may be charged to the payment account. The virtual piggybank system may verify the validity of the account using the adaptive account API for Authentication. A parent may provide the following information relating to a payment account: a) payment account name; b) payment account User name and password; c) payment account billing address (e.g., street number, street name, city, state, zip, country); and d) whether to accept outside payments to determine if someone else can fund this account. The last option will be discussed later.

At step 404 a parental account is created. In addition, one or more child accounts also may be created at this time. Account information, such as a user name, password, or payment information may be stored in a secure database by the virtual piggybank server.

To establish a child account, a child profile is created. A child profile may include a User name, password, and payment method, such as a payment account. A child may use the user name and password to conduct transactions on websites, online games and online applications that are approved by a parent through the virtual piggybank system.

Also, a child may add items to a wish-list, and a parent may review and approve items on a child's wish-list. A parent may either buy or remove an item from a child's wish-list. The wish-list may be customized. For examples, items in a wish-list may expire and be removed from the wish-list based on the settings of the wish-list.

Figure 10:
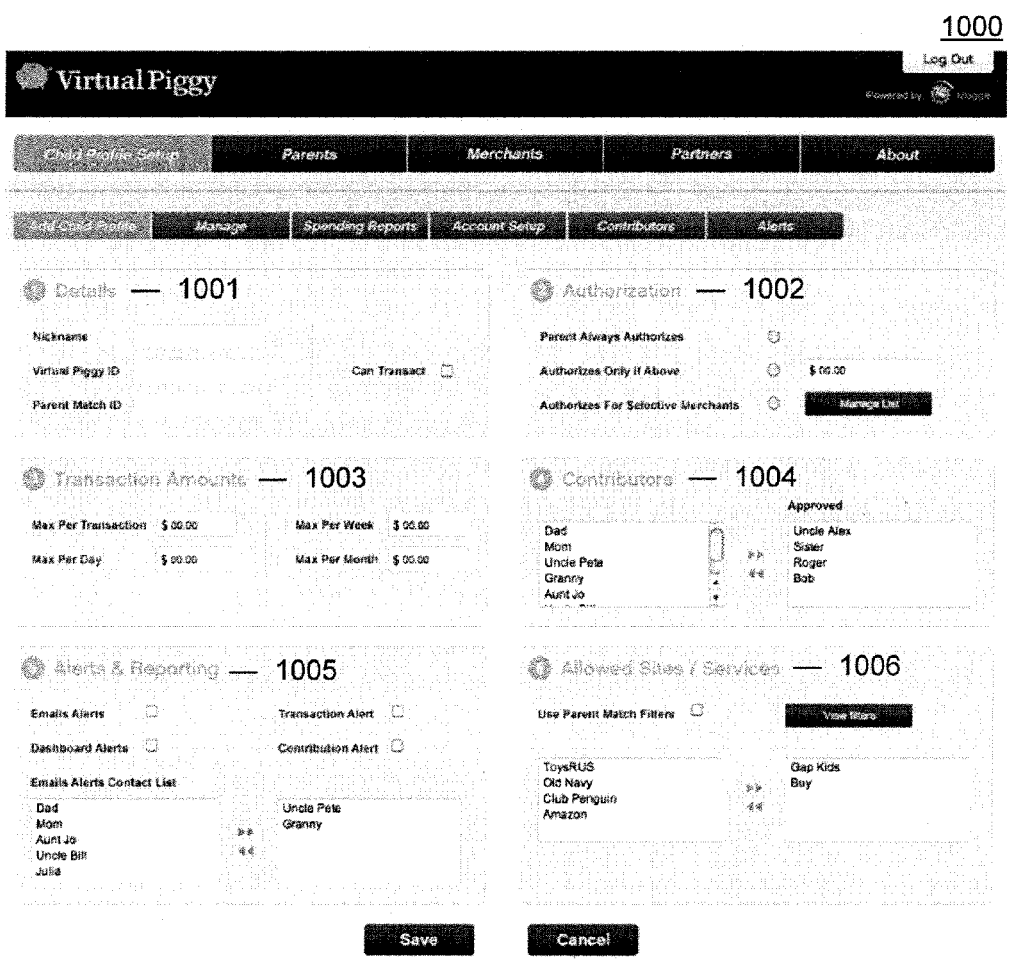
FIG. 10 illustrates an exemplary preferences add child profile screen according to an exemplary embodiment of the present invention.

Referring to FIG. 10, illustrated is an exemplary preferences add child profile screen according to an exemplary embodiment of the present invention.

As shown in FIG. 10, the add profile screen 1000 may be divided into several exemplary screen portions 1001-1006. At screen portion, 1001 a parent may identify a child by name or nickname. Also, a child may be given a child account user name that is associated with a parent account user name.

At screen portion 1002, a parent may authorize service requesters, including websites and other Internet based applications, that a child may visit, from which a child may make purchases, etc. A parent can control whether every service requester needs to be approved by a parent. The parent can also selectively define which service requesters need to be approved while other services may be automatically approved.

At screen portion 1003, a parent may approve transactions from the child account based on a spending amount. A spending limit that limits the amount of money that a child can spend without obtaining parental approval, or a periodic spending limit that limits the amount of money a child can spend on a periodic basis such as per week, per month, or over any particular time limit. Alternatively, a parent may set a spending limit that limits the amount of money a child can spend on an occasional basis, such as a child's birthday or other holiday. In another alternative, a parent may specify a payment account balance limit such that if the linked payment account balance goes below a specified balance, no additional transactions will be permitted from a child account linked to it.

At screen portion 1004, a parent may designate contributors to a child account. For example, a contributor may be another parent, grandparent, aunt, uncle, or other adult responsible for a child. At screen portion 1005, a parent may specify that notifications be sent for any information regarding the child account. Notifications may be sent by e-mail, SMS, voicemail, or the like. In addition, a parent may specify that notifications be sent to a contributor. At screen portion 1006, a parent may authorize certain service requesters for use by a child.

Referring back to FIG. 4, at step 405, the virtual piggybank system may allow the parent to designate one or more contributors to a child account. A contributor may be a person other than a parent who may add money into the virtual piggybank. For example, a grandparent, uncle, aunt, or other close family member may be designated as a contributor. The virtual piggybank system may allow a parent to impose one or more controls on a contributor. For example, a parent may designate a money limit that a contributor may add to a child account. Such a money limit may be determined by the total amount of money that is presently available to a child in a child account. Alternatively, a money limit may be applied per contributor. In addition, a parent may limit the frequency with which a contributor may add money to a child account.

For example, a parent may designate a person as a contributor by providing that person's name and e-mail address to the virtual piggybank system. The virtual piggybank system may send an e-mail along with an authentication code and a link to a contributor. This link may not expire so that a contributor person can bookmark this page to send repeatedly money when he/she wants. A contributor may then go to the link in the e-mail, enter the code, the validity of which is then determined, and if the code is valid then a contributor may be presented with a form that will allow them to enter their credit card information or payment account information, such as a PayPal or Google account.

At step 406, the virtual piggybank may allow a parent to setup a child profile. The virtual piggybank system may allow a parent to impose one or more controls on a child by setting up a child profile. A child profile may include a list of approved websites (i.e., Service Requester of FIGS. 3 and 8) where a child is authorized to spend money from a child account, a spending limit that limits the amount of money that a child can spend without obtaining parental approval, or a periodic spending limit that limits the amount of money a child can spend on a periodic basis such as per week, per month, or over any particular time limit. Alternatively, a parent may set a spending limit that limits the amount of money a child can spend on an occasional basis, such as a child's birthday or other holiday. In another alternative, a parent may specify a payment account balance limit such that if the linked payment account balance goes below a specified balance, no additional transactions will be permitted from a child account linked to it.

In addition, the virtual piggybank also may allow a parent to specify a time period during which a child may spend money from a child account. For example, a time period may be certain hours of the day, certain days of the week, or any period so desired.

At step 407, the virtual piggybank system may allow a parent to setup specific notifications. Notifications may be sent by e-mail, SMS, voicemail, or the like. Such notifications may include any information regarding the account, such as funds, usage, etc. For example, a parent or contributor may receive notifications concerning the amount of money available to a child or recent purchases of a child, if more than a certain number of transactions are carried out at a particular merchant or by a child over the course of a day, if suspicious behavior occurs (such as a number of unsuccessful login attempts or simultaneous login attempts were made). In another example, a parent or contributor may receive a notification requesting approval of a particular transaction of the child account. In this example, a reply SMS message or e-mail may be sent by a parent or contributor to approve a transaction. Alternatively, the virtual piggybank system may provide one or more links that may be clicked upon to approve or decline a particular transaction. If a notification is provided by phone, a request for approval may be requested after the recital of an automated message, and approval may be solicited through key selection.

Figure 5:
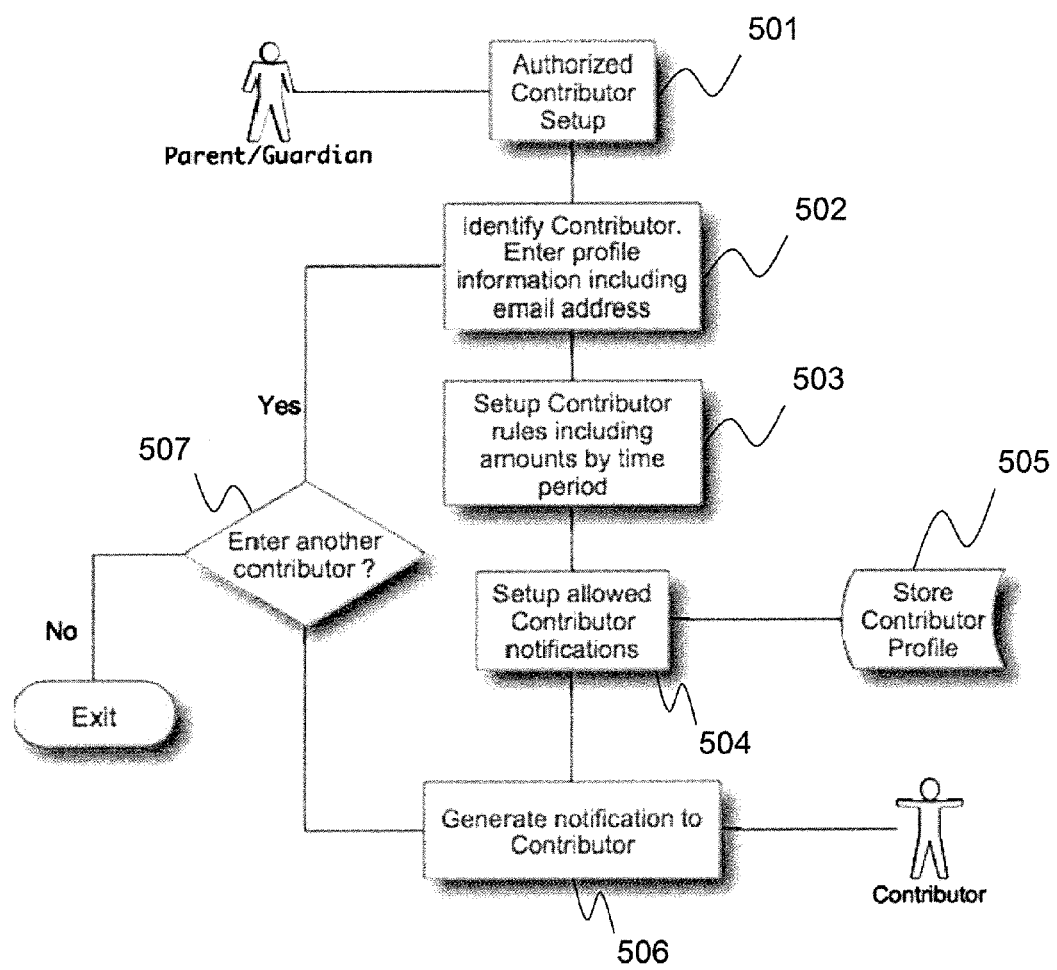
FIG. 5 is a flow chart illustrating a method for authorizing a contributor according to an exemplary embodiment of the present invention.

FIG. 5 is a flow chart illustrating a method for authorizing a contributor according to an exemplary embodiment of the present invention.

At step 501, a parent accesses the virtual piggybank system and selects an option to change the Authorized Contributor Setup. As discussed above, a contributor may be a person other than a parent who may add money into a child account of the virtual piggybank system. The virtual piggybank system may allow the parent to designate one or more contributors to a child account.

At step 502, a parent enters profile information for a contributor that that will be authorized by a parent to contribute funds to a child's account in the virtual piggybank. The profile information may include the contributor's name, address, email address, and any other information that will uniquely identify the contributor.

At step 503, the virtual piggybank system may allow a parent to impose one or more controls on a contributor. A parent is presented with a variety of controls that may be applied to a contributor regarding contributions that may be made to a child account. For example, a parent may designate a money limit that limits the amount of money a contributor may add to a child account. Such a money limit may be determined by the total amount of money that is presently available to a child account. Alternatively, a money limit may be applied per contributor. In addition, a parent may limit the frequency with which a contributor may add money to a child account.

At step 504, the virtual piggybank system may allow a parent to set specific notifications to be sent to a contributor. Such notifications may include any information regarding a child account, such as funds, usage, etc.

At step 505, profile information for a contributor is stored in a secure database by the virtual piggybank system. Account information such as a user name, password, or payment information, and notification sending information may be stored in a secure database by the virtual piggybank system.

At step 506, a parent then selects a notification mechanism that the virtual bank sends to the contributor. For example, a notification may be sent by e-mail, SMS, or voicemail. Of course, notifications also may be sent to a parent.

At step 507, a parent is given the option of adding additional contributors. If a parent desires to add an additional contributor, a parent again enters profile information for a contributor at step 502, and again proceeds through the steps outlined above.

Figure 6:
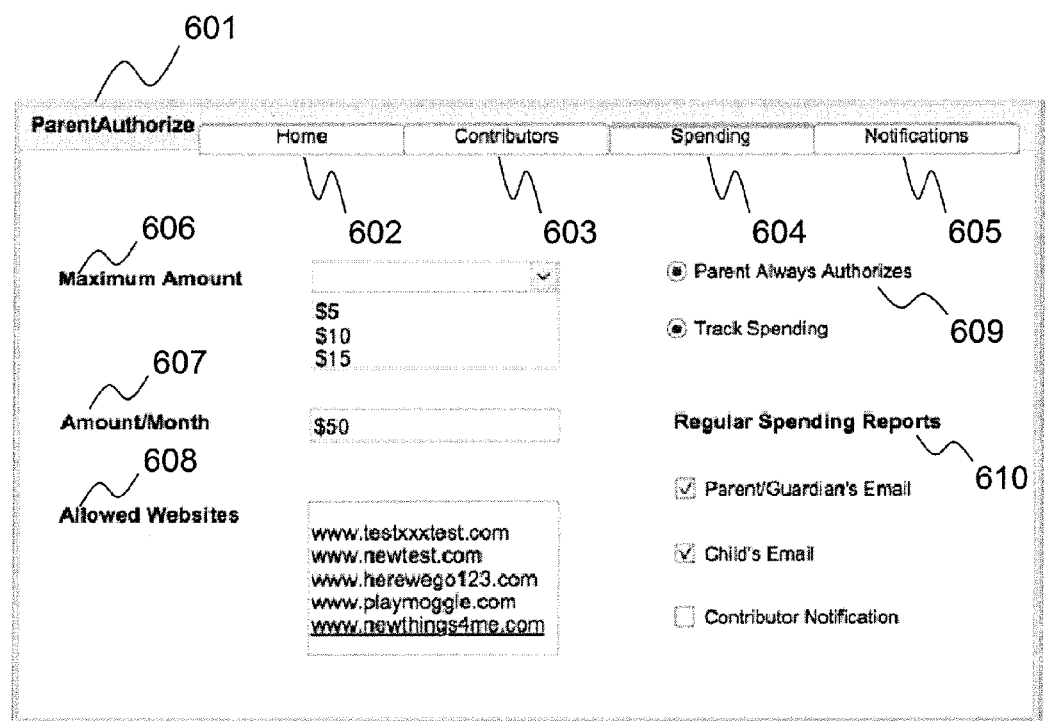
FIG. 6 is an exemplary screen shot of the preferences setup according to an exemplary embodiment of the present invention.

FIG. 6 is an exemplary screen shot of the preferences setup according to an exemplary embodiment of the present invention. Virtual piggybank may be implemented as a secure website a parent sees when setting up the preferences. Parent window 601 illustrates the main parental authorized information, which may include a Home tab 602, Contributors tab 603, Spending tab 604 and Notifications tab 605. The Home tab 602 may contain the general preferences for the parent, including basic contact information for the parent; email, fax, phone, etc. The Contributors tab 603 may hold preferences associated with the authorized contributors. The Spending tab 604 may contain information and preferences related to a child's allowed spending capabilities. This information may include, but is not limited to the maximum amount in a single transaction 606, total spending amount per month 607, websites on which the child may spend funds from the virtual piggybank 608, preferences around parental authorization (e.g., all purchases, purchases over a certain amount, purchases of certain types of product) 609, and preferences around who receives reports and notifications of child's actual spending 610 and frequency of reports.

Figure 7:
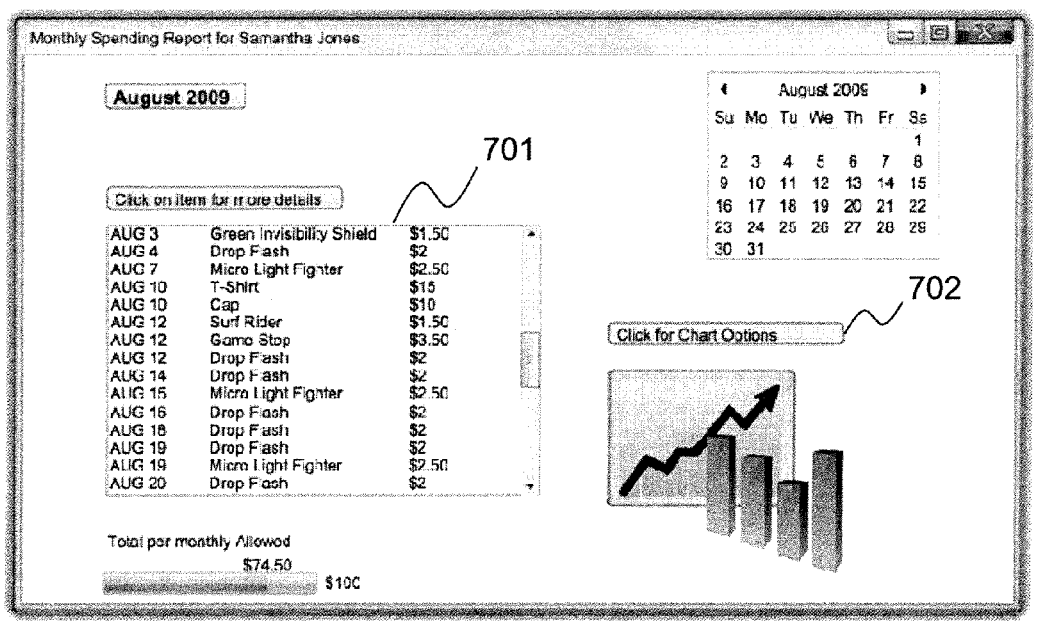
FIG. 7 is an exemplary monthly spending report according to an exemplary embodiment of the present invention.

FIG. 7 is an exemplary monthly spending report according to an exemplary embodiment of the present invention. The monthly report may contain information about the child's spending patterns 701 including an itemized list of all purchased items with the ability to drill down and get further details on the item. Further details would show information, such as the website from which the item was purchased, the total amount spent on that website to date, the time of purchase, etc. A parent may be able to see a child's spending patterns compared to prior months and compared to the total monthly spend allowed. A parent may also be able to chart the child's spending data 702, and in the case of a multi-child family, the parent will be able to compare the profiles of all of their children.

A parent may view a spending report by logging into the virtual piggybank system. A spending report may be an onscreen report that a parent can print or e-mail if desired. A spending report is customizable, and may show any combination of transaction dates, transaction amounts, service requesters, daily, weekly and monthly sub-totals. For example, a spending report may be generated for a particular service requester.

Figure 8:
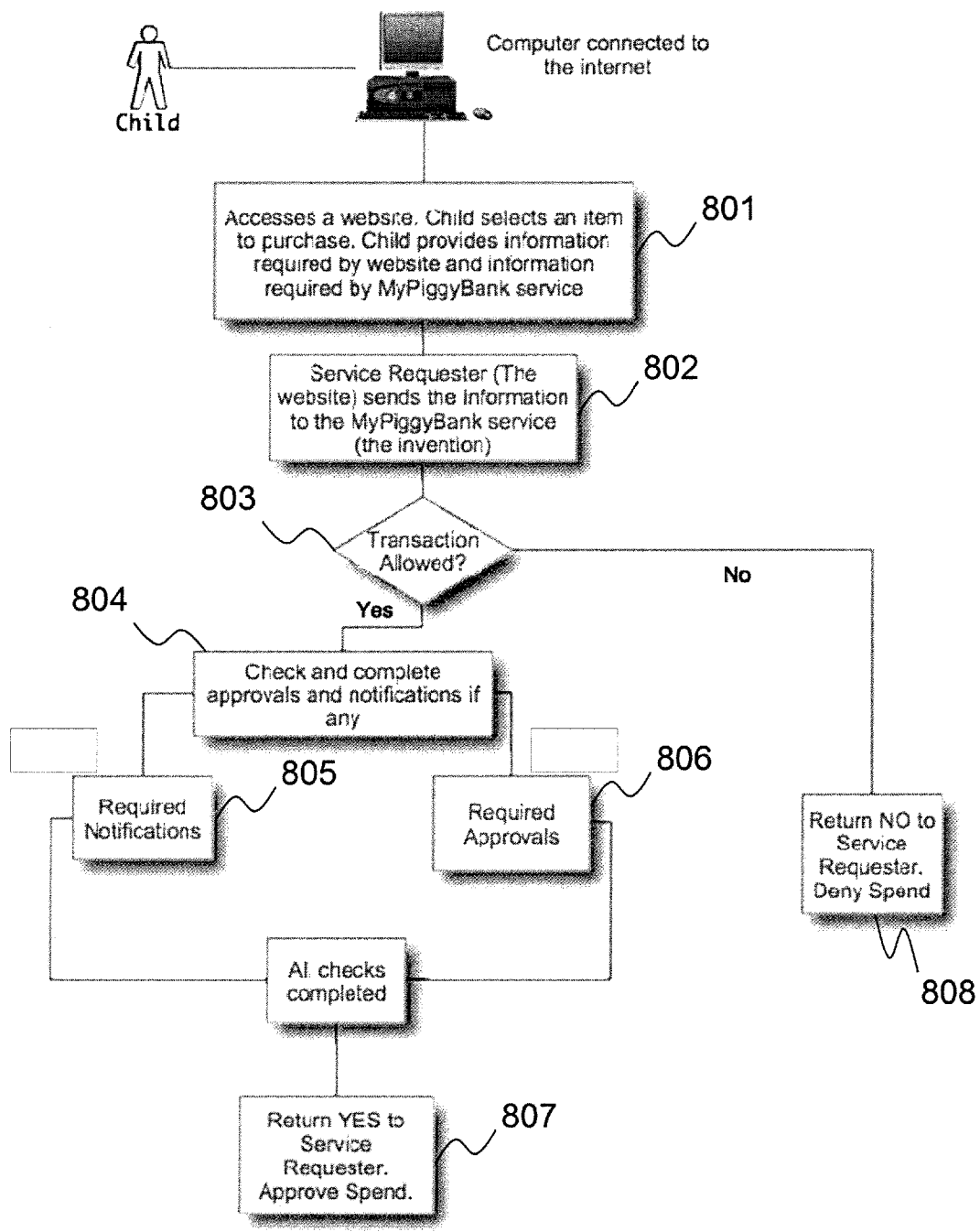
FIG. 8 is a flow chart illustrating a method for implementing the spending functionality of virtual piggybank according to an exemplary embodiment of the present invention.

FIG. 8 is a flow chart illustrating a method for implementing the child spending functionality of virtual piggybank according to an exemplary embodiment of the present invention.

At step 801, a child accesses an Internet website and selects an item for purchase. Here, the virtual piggybank system may first determine whether a parent has allowed a child to access the website that the child is attempting to access. If a child is allowed to access the website, a child may then enjoy the website's content. Otherwise, a child may be redirected to an alternate website.

At step 802, the website (i.e., Service Requester) makes a request to the virtual piggybank system. The request package contains all the required information necessary to identify the child attempting to make a purchase to the virtual piggybank system plus all the information about the proposed transaction.

A service requester may establish a merchant account with the virtual piggybank system. A merchant account allows a service requester to provide information to the virtual piggybank system to contact the service requester. For example, the virtual piggybank system may support OpenID. A service requester may use their OpenID account to setup a merchant account. In addition, a service requester may establish a payment acceptance account. This account will be used to accept payment. For example, a service requester may use PayPal or a Google account linked with a bank account associated with the service requester. The virtual piggybank system may verify the validity of the account using the adaptive account API for Authentication.

At step 803, the virtual piggybank system examines the request. In particular, the request is checked against a child profile to determine whether a transaction is allowed or not. A child profile includes information necessary to determine whether a transaction is allowed. For example, a child profile may include a list of approved websites where a child is authorized to spend money from a child account, a spending limit limiting the amount of money that a child can spend without obtaining parental approval, or a periodic spending limit limiting the amount of money a child can spend per week or per month, or over any particular time limit. In addition, the virtual piggybank also may allow a parent to specify a time period during which a child may spend money from a child account.

The virtual bank notifies the service requester whether the transaction is approved or not at steps 807 and 808, respectively. At the same time, if the transaction is approved, the virtual piggybank system may determine whether further approvals and/or notifications are required at step 804. It notifications are required, the required notification is sent to a parent or contributor, as appropriate, at step 805. Similarly, if a further approval is required, a seeking approval message is sent to a parent or contributor, as appropriate, at step 806. For example, an e-mail or SMS containing a seeking approval message may be sent to a parent or contributor. A parent or contributor may approve the pending transaction in a variety of ways such as reply SMS message, return e-mail, or by logging onto a parental or contributor account.

Thus, when a child logs onto the Internet and attempts to make a purchase at a Service Requester site that was previously designated as controlled by the virtual piggybank, the Service Requester bank makes a web service call to the virtual piggybank. The virtual piggybank exposes the preferences that were established by an adult, as described above, to the Service Requester. The preferences may be exposed to the service requester via an application programming interface through a web service, which may be a software system designed to support interoperable machine-to-machine interaction over the Internet.

Figure 9:
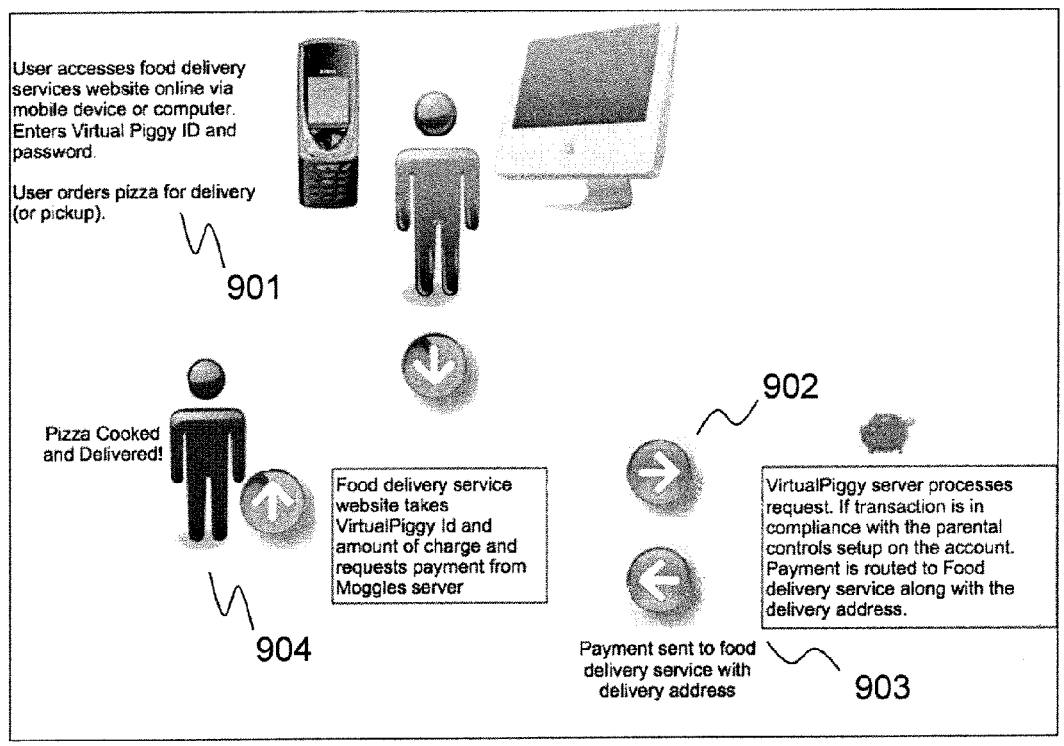
FIG. 9 illustrates an exemplary application of the virtual piggybank according to an exemplary embodiment of the present invention.

FIG. 9 illustrates an exemplary application of the virtual piggybank according to an exemplary embodiment of the present invention.

As shown in FIG. 9, a child user of a child account may access a service requester, such as a restaurant or food delivery system, at step 901. In this example, the service requester may obtain child account identifying information and present the child account information to the virtual piggybank system at step 902. Once the method for implementing the child spending functionality of virtual piggybank, as shown in FIG. 8, is performed and the service requester approved, a purchase from the service requester may be made. The virtual piggybank system then ensures that the service requester is paid for the selected service or item, at step 903. Accordingly, the service requester may then provide the purchased service or item, as shown in step 904.

As discussed above, a service requester may establish a merchant account with the virtual piggybank system. A merchant account allows a service requester to provide information to the virtual piggybank system to contact the service requester. For example, the virtual piggybank system may support OpenID. A service requester may use their OpenID account to setup a merchant account. In addition, a service requester may establish a payment acceptance account. This account will be used to accept payment. For example, a service requester may use PayPal or a Google account linked with a bank account associated with the service requester. The virtual piggybank system may verify the validity of the account using the adaptive account API for Authentication.

The virtual piggybank system may generate revenues by charging service requesters a fee per transaction. For example, the virtual piggybank system may use a payment account, such as a PayPal or Google account, as a payment network. The payment account may charge its standard rate (on average 2.9%+0.30 USD per transaction) in additional to the virtual piggybank rate.

It will be apparent to those skilled in the art that various modifications and variations can be made in the system and method for virtual piggybank of the present invention without departing from the spirit or scope of the invention. Thus, it is intended that the present invention cover the modifications and variations of this invention provided they come within the scope of the appended claims and their equivalents.

What is claimed is:

1. A method of providing control preferences for a prospective Internet user, the method comprising:
    establishing, at a client computer, a first account, the settings of the first account being stored in a database in a server computer, the server computer being different from the client computer;
    establishing a second account by a first user associated with the first account, the settings of the second account being stored in the database;
    linking the first and second accounts such that control settings of the second account are determined through the first account;
    establishing a profile for a second user associated with the second account for making a purchase from a service requester, the profile including the control settings and a username and a password established by the first user associated with the first account;
    establishing, at a merchant computer different from the client and server computers, a merchant account with the service requester to transact payment from the first account;
    making a purchase request from the second account to the merchant account, the second user associated with the second account entering the username and password;
    sending the profile for the second user associated with the second account and the purchase request to the first account from the merchant account;
    validating the authenticity of the profile for the second user associated with the second account by the first account;
    authorizing, by the first user of the first account, the purchase request for the merchant account to execute; and
    transacting the purchase request, selected by the second user of the second account, by transferring payment from the first account to the merchant account established with the service requester,
    wherein the making the purchase request from the second account further includes notifying the first user associated with the first account,
    wherein the second user of the second account is identified solely by the username and password, and
    wherein shipping information for the purchase request is provided to the merchant account from the first account according to settings made by the first user, such that the second user cannot change the shipping information.

2. The method of providing control preferences for a prospective Internet user according to claim 1, wherein the control settings include a list of approved service requesters, approved by the first user, where purchases can be made from the second account.

3. The method of providing control preferences for a prospective Internet user according to claim 1, wherein the notifying the first user associated with the first account is performed by e-mail or short message service.

4. The method of providing control preferences for a prospective Internet user according to claim 1, wherein at least one of the first and second accounts is linked to an Internet payment account.

5. The method of providing control preferences for a prospective Internet user according to claim 1, wherein account information for the first and second accounts is stored in a secure database.

6. The method of providing control preferences for a prospective Internet user according to claim 1, further comprising the first user's authorizing, from a list of identified contributors, one or more third-party contributors to access the second account if authorized by the first user associated with the first account.

7. The method of providing control preferences for a prospective Internet user according to claim 6, wherein the control settings of the second account designate an amount that each of the one or more third-party contributors may apply to the second account.

8. The method of providing control preferences for a prospective Internet user according to claim 6, wherein the control settings of the second account designate the frequency that each of the one or more third-party contributors may apply an amount to the second account.

9. A system providing control preferences for a prospective Internet user, comprising:
    a plurality of server computers;
    a database hosted on at least one of the plurality of server computers, the database configured to store information for a first account, a second account, and a merchant account;
    a service requester associated with the merchant account;
    wherein control settings of the second account are established by a first user, at a first user computer different from the plurality of server computers, through the first account such that a purchase request by a second user associated with the second account is made,
    wherein a profile that includes control settings is established, by the first user at the first user computer, for the second user associated with the second account for making a purchase from the service requester,
    wherein the first account, at the at least one of the plurality of server computers, receives the profile for the second user associated with the second account and the purchase request from the merchant account, validates the authenticity of the profile, and authorizes execution of the purchase request,
    wherein the at least one of the plurality of server computers is further configured to initiate the purchase from the second account consistent with the control settings established by the first user of the first account at the first user computer,
    wherein the at least one of the plurality of server computers is configured to transact a payment between the first account and the merchant account associated with the service requester,
    wherein the at least one of the plurality of server computers is further configured to notify the first user associated with the first account when the purchase from the second account is being made, wherein the second user of the second account is identified solely by a username and password, and wherein shipping information for the purchase request is provided to the merchant account from the first account according to settings made by the first user, such that the second user cannot change the shipping information.

10. The system providing control preferences for a prospective Internet user according to claim 9, wherein the control settings include a list of approved service requesters where purchases can be made by the second user from the second account if authorized by the first user associated with the first account.

11. The system providing control preferences for a prospective Internet user according to claim 9, wherein the first user associated with the first account is notified by e-mail or short message service.

12. The system providing control preferences for a prospective Internet user according to claim 9, wherein at least one of the first and second accounts is an Internet payment account.

13. The system providing control preferences for a prospective Internet user according to claim 9, wherein account information for the first and second accounts is stored in a secure database.

14. The system providing control preferences for a prospective Internet user according to claim 9, further comprising a list of identified contributors from which the first user authorizes one or more approved third-party contributors such that the second user may send contribution requests only to the approved third-party contributors.

15. The system providing control preferences for a prospective Internet user according to claim 14, wherein the control settings of the second account designate an amount that each of the one or more third-party contributors may apply to the second account.

16. The system providing control preferences for a prospective Internet user according to claim 9, wherein the control settings of the second account designate the frequency that each of the one or more third-party contributors may apply an amount to the second account.

17. A method of providing control preferences for a prospective Internet user, the method comprising:
 establishing an online account that includes specific control parameters being stored in a database at a first server computer, the online account including a first account, a second account linked to first account, and a merchant account;
 activating the online account by accessing, at a client computer different from the server computer, a web based system designated by the online account by making a purchase request to the web based system from the second account;
 sending from the client computer, to the first account at the server computer, the specific control parameters associated with activating the online account and the purchase request via the merchant account;
 validating the authenticity of the specific control parameters by the first account;
 authorizing from the first account, the purchase request for the merchant account to execute;
 transacting the purchase request by transferring payment from the first account to the merchant account associated with the web based system; and
 controlling a use, by a user of the second account, of the web based system through the online account, wherein the controlling the user's use of the web based system includes allowing another user associated with the first account to be notified when a purchase is being made, wherein the user of the second account is identified solely by a username and password, and wherein shipping information for the purchase request is provided to the merchant account from the first account according to settings made by the another user, such that the user of the second account cannot change the shipping information.

18. The method of providing control preferences for a prospective Internet user according to claim 17, wherein the specific control parameters include which web based systems can be accessed, how much money can be spent at the web based systems, how much money can be spent over a certain time period, and who may contribute money to the online account.

19. The method of providing control preferences for a prospective Internet user according to claim 17, wherein the online account is exposed to the web based system through an application programming interface within a website associated with the merchant account.

20. The method of providing control preferences for a prospective Internet user according to claim 1, wherein at least one of the first user associated with the first account and the second user associated with the second account uses a mobile device.

21. The system providing control preferences for a prospective Internet user according to claim 9, wherein at least one of the first user associated with the first account and the second user associated with the second account uses a mobile device.

22. The method of providing control preferences for a prospective Internet user according to claim 17, wherein at least the notifying includes the use of a mobile device.

23. A method for allowing a ward's guardian to control internet transactions of the ward, the method comprising:
 providing a guardian server computer, including a database for storing information related to the guardian and information related to controls on the ward's ability to make internet purchases;
 providing a ward server computer linked to the guardian server, the ward server computer including:
  a database for storing information related to the ward and to at least one merchant approved by the guardian; and
  purchasing controls set up through the guardian server computer,
  wherein, in response to the ward through the ward server selecting to purchase goods or services from the at least one merchant, information for the merchant to fulfill the purchase is provided to the merchant only from the database of the guardian server computer and not from the ward server computer,
  wherein the second user of the second account is identified solely by a username and password, and
  wherein shipping information for the purchase request is provided from the first account according to settings made by the first user, such that the second user cannot change the shipping information.

24. The method according to claim 23, wherein the guardian is a parent and the ward is a child.

25. The method according to claim 23, wherein the information includes payment and shipping information.

26. The method according to claim 23, wherein the guardian server computer includes controls on what entity may contribute funds to the ward.

27. The method according to claim 23, wherein the guardian server computer includes controls on how much money the ward can spend at the at least one merchant.

28. The method according to claim 1, wherein the authorizing the purchase request is performed in response to the notification being received.

29. The method according to claim 18, wherein the user may send requests for contributions of money only to third-party contributors included in the control parameter of who may contribute money to the online account.

* * * * *

UNITED STATES PATENT AND TRADEMARK OFFICE
CERTIFICATE OF CORRECTION

| | | |
|---|---|---|
| PATENT NO. | : 8,812,395 B2 | Page 1 of 1 |
| APPLICATION NO. | : 13/247572 | |
| DATED | : August 19, 2014 | |
| INVENTOR(S) | : Jo Webber et al. | |

It is certified that error appears in the above-identified patent and that said Letters Patent is hereby corrected as shown below:

On The Title Page

In the Inventors section under item (75), for the state of residence for Pradeep Ittycheria, delete "Philadelphia, OR" and insert --Philadelphia, PA--

In the Related U.S. Application Data section, at the end of the listing of provisional applications under item (60), insert --provisional application No. 61/272,234, filed on September 3, 2009--

Signed and Sealed this
Twenty-seventh Day of January, 2015

Michelle K. Lee
*Deputy Director of the United States Patent and Trademark Office*